United States Patent Office 3,305,563
Patented Feb. 21, 1967

3,305,563
PESTICIDES (D)
Victor Mark, Norristown, Pa., assignor to Monsanto Company, St. Louis, Mo., a corporation of Delaware
No Drawing. Filed Dec. 11, 1963, Ser. No. 329,911
15 Claims. (Cl. 260—332.3)

This application is a continuation-in-part of my application Serial No. 132,570, filed August 21, 1961, now abandoned, which in turn is a continuation-in-part of my application Serial No. 44,890, filed July 25, 1960.

This invention relates to new chemical compounds and to methods of their synthesis. More specifically, the invention is directed to new Diels-Alder type adducts of unusual value. The preparation involves the adduction of substituted halocyclopentadienes and certain types of olefins.

It is well known that hexachlorocyclopentadiene can be reacted with olefins to form adducts which are toxic to living organisms. Although many of these are very toxic to most insects, they are dangerous to use because of their mammalian toxicity. In the use of these compounds insect toxicity is frequently sacrificed in favor of safety to operating personnel.

It is a fundamental purpose of this invention to provide new biological toxicants with greatly reduced mammalian toxicity without serious reduction in toxicity to microorganisms. A further purpose is to make available active insecticides, fungicides and herbicides which are relatively safe to use. Other purposes will be apparent from the following description of the preparation and use of the new biologically active compounds.

In applications Serial Number 44,890 and Serial Number 132,570 there is described a family of halocyclopentadienes which have one or more organic radicals substituted on the cyclopentadiene ring at least one of which is in the allylic position (i.e. on the carbon atom which is not involved in an unsaturated bond). The novel method by which the new compounds are prepared is also claimed therein. These compounds are used in the practice of the present invention and are in accordance therewith adducted to olefins having certain structural configurations.

It is well known that the Diels-Alder adduction involves the reaction of a diene with an unsaturated compound. It is further known that hexachlorocyclopentadienes react in this manner with a wide variety of unsaturated compounds. In accordance with the present invention it has been found that compounds of quite different and valuable properties are prepared by the use of the substituted hexahalocyclopentadienes described in the earlier filed applications.

These reactants are represented by the structural formula

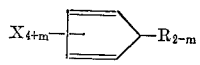

wherein the X's represent halogen atoms of the group consisting of chlorine, bromine, fluorine and iodine; subscript $m$ being an integer from zero (0) to one (1); and wherein each R is a radical selected from the class consisting of hydrocarbon radicals having up to 20 carbon atoms selected from the group consisting of alkyl radicals such as methyl, ethyl, n-propyl, isopropyl, butyl, isobutyl, sec-butyl, tert-butyl, hexyl, 2-ethylhexyl, decyl, dodecyl and octadecyl radicals; alkenyl radicals, such as vinyl, allyl, methallyl, crotyl, 2-hexenyl, 10-undecenyl and 2-hexadecenyl radicals; the alkynyl radicals such as ethynyl, propargyl, 2-butynyl, 8-decynyl and 2-octadecynyl radicals; the cycloalkyl radicals, such as cyclopropyl, cyclobutyl, cyclopentyl, cyclohexyl, cyclooctyl, norbornyl, tricyclo-[2,2,1,0$^{2,6}$]-hept-3-yl and cyclopropylmethyl radicals; the cycloalkenyl radicals, such as 3-cyclopentenyl, 2-cyclohexenyl, 2-cycloheptenyl, cyclooctenyl, 2-norbornen-5-yl, and nopyl radicals; the aryl radicals, such as phenyl, biphenylyl, naphthyl, triphenylmethyl and anthracyl radicals; the alkaryl radicals, such as p-tolyl, 2,4-dimethylphenyl, 7 - methyl-1-naphthyl, p-ethylbiphenylyl and 10-ethyl-9-anthracyl radicals; the alkenaryl radicals, such as p-allylphenyl, m-methallylphenyl, p-hexadecenylphenyl and the corresponding substituted naphthyl and biphenyl radicals; the alkyl substituted cycloalkyl radicals, such as 4-dodecylcyclohexyl and the 2-ethylcyclopentyl radicals; the alkenyl substituted cycloalkyl radicals, such as 2-allyl-cyclopentyl; the alkynyl substituted cycloalkyl radicals, such as 4-propargylcyclohexyl, ethynylcyclopentyl; the alkyl cycloalkenyl radicals, such as 3-ethyl-2-cycloheptenyl; the alkenylcycloalkenyl radicals, such as 4-allyl-2-cyclohexenyl and 4-vinyl-2-cycohexenyl; the alkynylcycloalkenyl radicals, such as 4-propargyl-2-cyclohexenyl; the aralkyl radicals such as benzyl, 2-phenethyl and indenyl radicals; the aralkenyl radicals, such as cinnamyl and styryl radicals; the aralkynyl radicals, such as 3-phenylpropargyl; the cycloalkyl substituted alkyl, such as 3-cyclohexylpropyl; the cycloalkyl substituted alkenyl radicals, such as 3-cycloheptylallyl, and 3-cyclopentylmethallyl radicals; the cycloalkyl substituted alkynyl radicals, such as 3-cyclooctylpropargyl and 10-cycohexyldecynyl radicals; the cycloalkenylalkyl radicals, such as 2(2-cyclopentenyl)ethyl and 2(1-cyclohexenyl) methyl; the cycloalkenyl substituted alkenyl radicals, such as 4(1-cyclopentenyl)-2-butenyl and the 2(1-cyclohexenyl)vinyl radicals; the cycloalkenyl substituted alkynyl radicals, such as the 3(2-cyclohexenyl)propargyl radical; the alkyl substituted aralkyl radicals, such as p-ethylbenzyl; the alkenyl substituted aralkyl radicals, such as p-allylphenethyl; the alkynyl substituted aralkyl radicals, such as 10(p-propargylphenyl)decyl; the alkyl substituted aralkenyl radicals, such as 2,4-dimethylcinnamyl; the alkenyl substituted aralkenyl radicals, such as the p-allylstyryl radicals; and the said hydrocarbon radicals containing substituents of the group consisting of chlorine, as in 2-chloroethyl and p-chlorobenzyl; bromine, as in 4-bromobutyl; fluorine, as in 2,2,2-trifluoroethyl; iodine, such as in 2,4,6-tri-iodobenzyl; alkoxy, such as in 2-methoxyethyl and p-isopropoxybenzyl; aryloxy, such as in 2-phenoxyethyl and p-methoxybenzyl; nitro, such as in o-nitrobenzyl; cyano, such as in 2-cyanoethyl; thiocyano, such as in 3-thiocyanoallyl; isocyano, such as in m-isocyanophenyl; mercapto, such as in p-mercaptobenzyl; hydroxyl, such as in 3-hydroxypropyl; acyloxy, such as o-acetyloxybenzyl; isothiocyano, such as in 2-isothiocyanoethyl; acyl, such as in p-acetylphenyl; hydrocarbonoxy carbonyl, such as the methyl ester of p-carboxybenzyl; the alkylthio, such as 2-methylthiopropyl; arylthio, such as in phenylthiomethyl; aralkylthio, such as in 2-benzylthioethyl; amino, such as in 2-aminoethyl; hydrocarbon amino, such as in 2-dimethylaminoethyl; hydrocarbon sulfonyl, such as in 2-isopropylsulfonylethyl; hydrocarbon sulfinyl, such as in 2-phenylsulfinylethyl; furyl, such as in furfuryl; thienyl, such as in thenyl; pyridyl, such as in 2-pyridylethyl; piperidyl, such as in 4-piperidyl; glycidyl, such as in glycidyl and glycidylmethyl; morpholyl, such as in 2(2-morpholyl)ethyl; tetrahydrofuryl, such as in tetrahydrofurfuryl; dihydrofuryl, such as dihydrofurfuryl, tetrahydrothienyl, such as tetrahydrothenyl; dihydrothenyl, such as in dihydrothenyl; the hydrocarbon and acyl groups of the said substituents having up to 20 carbon atoms.

This invention involves the adduction of the above identified polyhalocyclopentadienes with organic compounds containing carbon to carbon unsaturated bonds, hereinafter designated as the dienophiles, said polyhalocyclopentadienes having at least one organic radical on the allylic carbon atom (one that is not involved in a carbon to carbon double bond). The halogen substituents on the polyhalocyclopentadiene may be chlorine, bromine, fluorine, or iodine and may be the same or different halogen atoms on the cyclopentadiene molecule.

The conditions of reaction between the described cyclopentadienes and the dienophiles are dependent upon the nature and relative reactivity of the reactants. The reaction may be conducted at room temperature and atmospheric pressures, but a wide range of conditions are practicable, usually higher than room temperatures and often higher than atmospheric pressures are required with most reactants.

When the dienophile is very reactive, the simple mixing of the reactants at or below room temperature initiates the reaction. Cooling is then necessary to keep the reactants in liquid form and within the temperature range desired for optimum conversion. It is convenient often to confine the reaction mixture in a closed system to prevent the escape of the volatile component. The use of closed vessels (autoclaves) is especially desirable when the dienophile is gaseous at room temperature. Furthermore, when the reaction partners do not readily interact, the application of heating may be desirable to increase the rate of adduction; this often is done in autoclaves and under autogenous pressures.

The reaction often is conducted in the presence of appropriate solvents. These may have multiple beneficial effects. For instance, a liquid with good solvent properties for the less soluble component might increase the effective concentration, and the rate of the reaction. A liquid often is used when an internal coolant is needed to keep the temperature within a narrow range. By choosing a liquid with a boiling point close to the temperature required for the reaction, the danger of overheating is greatly reduced because the refluxing liquid dissipates the heat of the reaction. Suitable inert solvents are hydrocarbons (benzene, toluene), ethers, halogenated solvents (chlorobenzene) and the like.

The use of catalysts is often desirable in order to speed up the rate of conversion of sluggish reactants. Lewis acids, such as those used in the Friedel-Crafts reaction, are especially useful catalysts. These include $AlCl_3$, $BF_3$, $SbCl_3$, $FeCl_3$, etc.

Further details in the preparation and use of the new compounds are set forth hereinafter in specific examples.

The new compounds of this invention are the heterocyclic compounds prepared from dicyclic dienophiles. This type of adduction product may be represented by the structure.

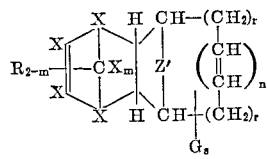

wherein R, X, G, $m$, $n$, $s$, and $r$ are as defined above; and wherein Z' is selected from the group of radicals selected from —O—, —S—, —NK—, —Se—, —CH$_2$O— and —CH$_2$NK—; wherein K is an alkyl radical of up to four carbon atoms. These compounds may be prepared from dienophiles as follows: 3,6 - epoxy-4-cyclohexenedicarboxylic anhydride, 1,4-epoxy-2-cyclohexene, 1,4-epithia-2 - cyclohexene, 1,4-methylimino-2-cyclohexene, 5,6-dichloro-1,4-epoxy-2-cyclohexene, 1,4-epoxy-2,5-cyclohexadiene.

Preferred compounds of this invention have the formula

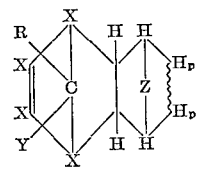

wherein X is selected from the class consisting of chlorine and bromine; wherein R is selected from the class consisting of alkyl radicals having up to eight carbon atoms, alkenyl radicals having up to eight carbon atoms, chloroalkyl radicals having two to eight carbon atoms and free of chlorine substituents on the alpha carbon atom, and oxaalkyl radicals having up to eight carbon atoms; wherein Z is selected from the group consisting of oxygen and sulfur; wherein the symbol ≀ represents interatomic bonds selected from the class consisting of single bonds and olefinic double bonds; and wherein $p$ is an integer from one to two.

Further details of the preparation of the novel compounds are set forth in the following specific examples.

*Example 1*

Pentachloro-5-methylcyclopentadiene was charged to a three-neck flask, equipped with a stirrer, thermometer, reflux condenser and a dropping funnel extending below the surface of the flask contents. The flask and contents were heated to 160° C. and an equimolar proportion of 3,6-epoxy-1-cyclohexene was added at a rate which permitted the reaction temperature to be maintained. The compound recovered from the reaction mixture was found to have the formula

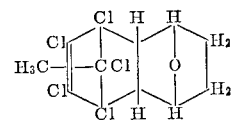

*Example 2*

Repeating Example 1 except for the substitution of 1,4-epoxy-2,5-cyclohexadiene for the cyclohexene produced a compound of the formula

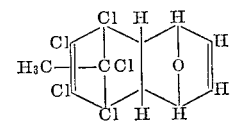

*Example 3*

The adduction of 1,2,3,4-tetrachloro-5,5-di(2-chloroethyl)cyclopentadiene and 1,4-epithiacyclohexene under the conditions of Example 1 resulted in a compound of the formula

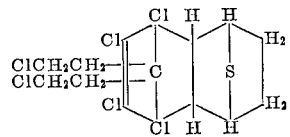

*Example 4*

The adduction by the procedure of the above examples of 1,2,3,4,5-pentachloro-5-(6-methoxyhexyl)cyclopentadiene and 1,4-methylimino-2-cyclohexene produced a compound of the formula

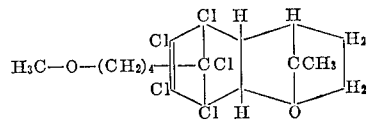

*Example 5*

The adduction of 1,2,3,4,5-pentachloro-5-(2-ethylhexyl)cyclopentadiene and 3,6-epoxy-1-cyclohexene under the conditions of Example 1 produced a compound of the formula

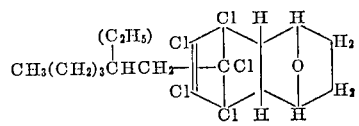

Example 6

Repeating the procedure of Example 1 except that 1,4-epithia-2,5-cyclohexadiene was substituted for the epoxy derivative resulted in the synthesis of the compound:

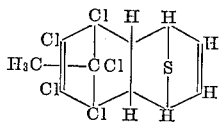

Example 7

The adduction of 1,2,3,4,5-pentabromo-5-allylcyclopentadiene with 3,6-epoxycyclohexene yielded the compound

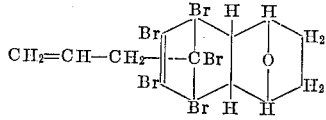

Example 8

Using the procedure analogous to that of Example 1, 1,2,3,4-tetrachloro-5,5-diethylcyclopentadiene was adducted with 1,4-epoxy-2,5-cyclohexadiene resulting in the synthesis of the compound

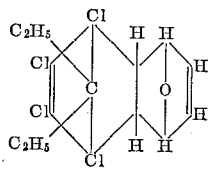

The above examples represent preferred modifications of the invention and these will suggest further variations to one skilled in the art. Similarly, the following claims are directed to more useful modifications of the invention, but other compounds of the claims defined broadly will have similar utility.

What is claimed is:

1. A compound of the structure

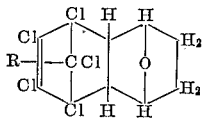

wherein R is an alkyl radical of up to eight carbon atoms.

2. A compound of the structure

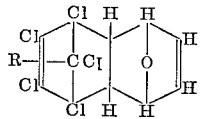

wherein R is an alkyl radical of up to eight carbon atoms.

3. A compound of the structure

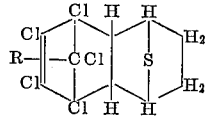

wherein R is an alkyl radical of up to eight carbon atoms.

4. A compound of the structure

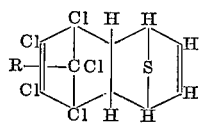

wherein R is an alkyl radical of up to eight carbon atoms.

5. A compound of the structure

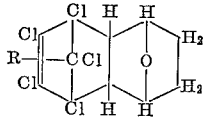

wherein R is an alkenyl radical of up to eight carbon atoms.

6. A compound of the structure

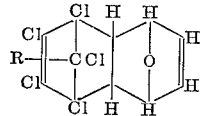

wherein R is an alkenyl radical of up to eight carbon atoms.

7. A compound of the structure

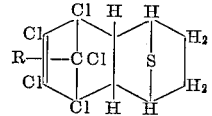

wherein R is an alkenyl radical of up to eight carbon atoms.

8. A compound of the structure

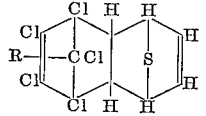

wherein R is an alkenyl radical of up to eight carbon atoms.

9. A compound of the structure

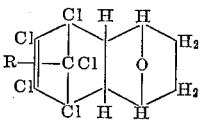

wherein R is a chloroalkyl radical wherein the alkyl has up to eight carbon atoms and the alpha carbon atom free of chlorine.

10. A compound of the structure

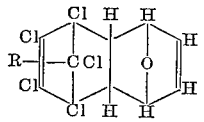

wherein R is a chloroalkyl radical wherein the alkyl has up to eight carbon atoms and the alpha carbon atom free of chlorine.

11. A compound of the structure

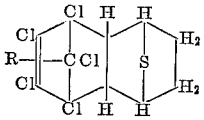

wherein R is a chloroalkyl radical wherein the alkyl has up to eight carbon atoms and the alpha carbon atom free of chlorine.

12. A compound of the structure

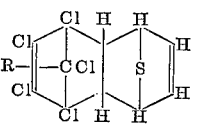

wherein R is a chloroalkyl radical wherein the alkyl has up to eight carbon atoms and the alpha carbon atom free of chlorine.

13. A compound of the structure

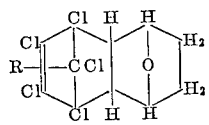

wherein R is an oxaalkyl radical of up to eight carbon atoms.

14. A compound of the structure

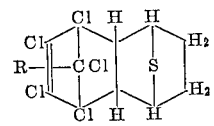

wherein R is an oxaalkyl radical of up to eight carbon atoms.

15. A compound of the structure

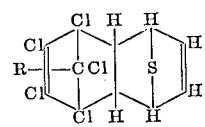

wherein R is an oxaalkyl radical of up to eight carbon atoms.

References Cited by the Examiner
UNITED STATES PATENTS
3,031,464  4/1962  Molotsky _____ 260—346.2

WALTER A. MODANCE, *Primary Examiner.*

J. A. PATTEN, *Assistant Examiner.*